Dec. 25, 1951  J. H. HAYES  2,579,739
DETACHABLE CONNECTOR
Filed June 28, 1948
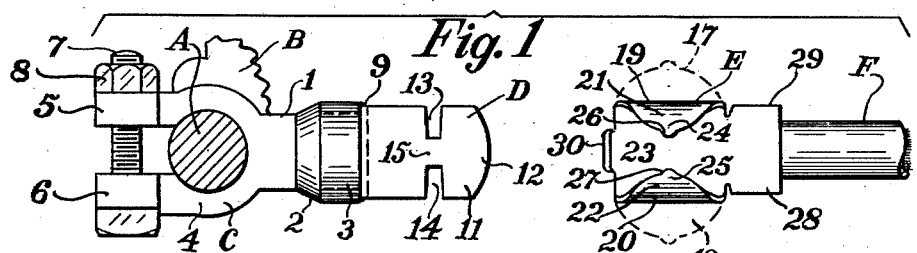
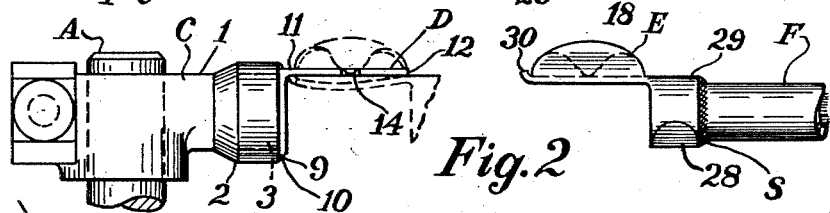
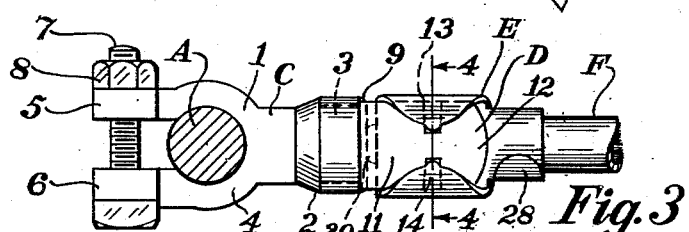
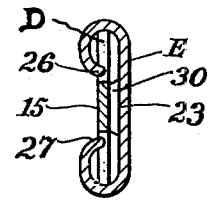
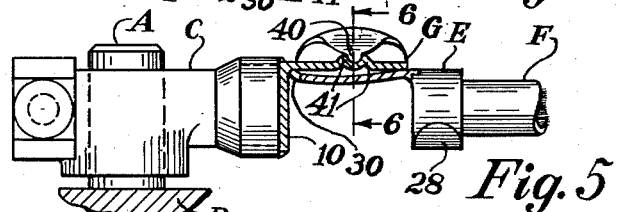
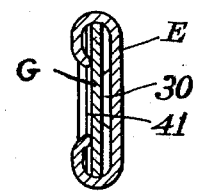
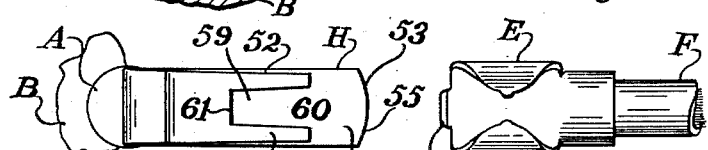
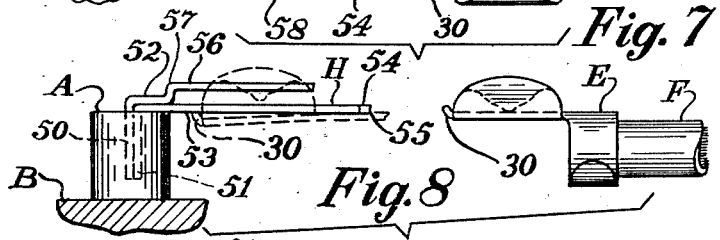
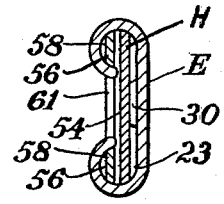
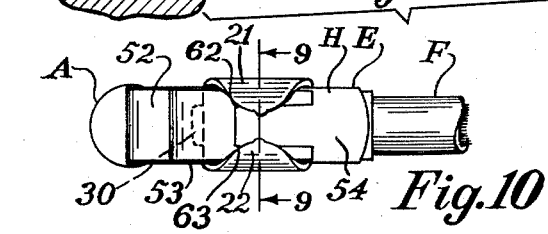
INVENTOR.
Joseph H. Hayes
BY
Pearson + Pearson
ATTORNEYS Patented Dec. 25, 1951

2,579,739

UNITED STATES PATENT OFFICE 2,579,739

DETACHABLE CONNECTOR

Joseph H. Hayes, Lawrence, Mass.

Application June 28, 1948, Serial No. 35,569

3 Claims. (Cl. 173—259)

This invention relates to detachable connectors for battery cables and the like.

The object of the invention is to provide a flat metal blade or tongue permanently attached to a terminal or a terminal clamp of a storage battery and a clamping device, also formed from flat metal sheet material, permanently attached to a cable leading to or from the battery. The material used for my tongue and clamp may be any suitable, resilient, conductor of electric current such as brass or copper and the parts may be economically and rapidly stamped out of such material.

By the use of my fixed tongue and easily detachable clamp a positive electrical connection is achieved when the two are interengaged and corrosion at the connection is eliminated. Upon changing batteries, as in a motor vehicle, it is only necessary to pull each clamp off each terminal tongue rather than having to use a wrench, chemical corrosion solvents and pry bars in an inconvenient space to remove the usual type of bolt-fashioned bifurcated cable connector. No tools are necessary to disconnect the battery equipped with my invention, and manufacture and installation of the same is exceedingly simple. In case of a short circuit or similar electrical trouble, battery cables equipped with my device can be quickly disengaged from the battery thus preventing further damage to the wiring and facilitating repairs.

I am aware that tongues and clamps have heretofore been proposed for use as detachable connectors but many of these tend to become accidentally disengaged by reason of the vibration and road shocks to which a motor vehicle is constantly subjected. The yielding resilient metal from which such clamps are fashioned also tends to crystallize after a time and to lose its spring like qualities which may cause the clamp to fall away from the tongue.

In my device I provide a spring pressure contact by the underside of the rounded tips of the jaws of my clamp with the edges of a notch in the tongue. In addition I provide a spring pressed contact at the opposite end of the connection comprising an upstanding lip or projection at the forward end of the clamp which yieldingly presses against the underside of the blade or tongue. I thus achieve two resilient contacts, one at each end of the telescoped connection and each pressing in the opposite direction to keep the parts under constant spring pressure.

In the drawings, Fig. 1 is a plan view showing one form of the tongue fixed to a well known type of terminal connection and showing my improved clamp member fixed to a cable.

Fig. 2 is a side view of the device shown in Fig. 1, illustrating in dotted lines how the clamp fits the tongue.

Fig. 3 is a plan view of the device shown in Figs. 1 and 2, showing the parts connected.

Fig. 4 is a sectional view on line 4—4 of Fig. 3.

Fig. 5 is a side view showing a modified form of tongue connected to my new clamp.

Fig. 6 is a view similar to Fig. 4 on line 6—6 of Fig. 5.

Fig. 7 is a plan view of the preferred form of my device.

Fig. 8 is a side view of the device shown in Fig. 7.

Fig. 9 is a sectional view on line 9—9 of Fig. 10, and

Fig. 10 is a plan view showing my preferred tongue and clamp connected together as in use.

As shown in Figs. 1 to 4, A is an upright terminal of a storage battery B and having a well known type of terminal clamp C fastened thereto. C comprises a body 1 having a cable end 2, with a cylindrical cable hole 3, and a terminal end 4 with opposite jaws 5 and 6 arranged to be brought together by a threaded bolt 7 passing through the ends of the jaws when nut 8 is tightened.

Instead of fixing an electrical cable such as F, in the hole 3 by welding, solder or other means, as is still the custom in the trade, I affix a flat elongated blade or tongue D to the end of 2, by any convenient method such as solder 9. D is preferably L-shaped with a downwardly depending leg 10 and a forwardly projecting leg 11, the latter having a rounded front edge at 12. I provide transverse recesses in the form of cuts 13 and 14 in each side of D, leaving sufficient material in the centre at 15 to give adequate strength to the tongue D. The upper and under surfaces of D are smooth in this construction.

To interengage with D, I provide a clamping member E, preferably stamped from the same electrical conducting sheet material, such as brass or copper, as is D. Ears or wings 17 and 18 shown in dotted lines in Fig. 1 are provided in E, and are bent back upon E along the longitudinal edges 19 and 20 to form resilient, oppositely disposed, jaws 21 and 22. Jaws 22 and 21 have a clearance with the flat part 23 of E, which is less than the thickness of D in order that they may grasp E with yielding pressure and the free ends of each jaw 24 and 25 taper to a narrow rounded tip 26 and 27.

I provide arms 28 and 29 at the rear of E, stamped from the same material which may be bent around a cable such as F in overlapping relationship to grasp the same and preferably solder them in place, after bending, by solder S.

At the forward end of part 23 of E, I also provide a rounded, upstanding lip 30, which extends higher than the plane of the tips 26 and 27 of jaws 22 and 21 so that a tongue such as D when held in E will be pressed downwardly by the edges of tips 26 and 27 acting on the edges of recesses 13 and 14 and upwardly by lip 30, both with yielding spring pressure. The parts D and E are thus held firmly together but since 26 and 27 are rounded E may be withdrawn from D by a slight pull in the direction of cable F.

In Figs. 5 and 6, I show the same type of clamp E combined with a modified form of tongue G, the latter being of L-shape and fixed to a clamp C as explained above. In place of a recess such as 13 or 14 in D, I provide a recess 40, extending across G formed by undulating the material of G into two humps 41 to produce a depression at 40.

The preferred form of my connector is shown in Figs. 7-10, wherein the clamp E is unchanged but the tongue or blade part H is of a construction somewhat different from E and G. Instead of welding or soldering H to a clamp such as C, I form a slot in the terminal A and insert the legs 50, and 51 of two L-shaped members 52 and 53 therein where they are permanently fixed by any suitable means. 54 is the other leg of member 53 and comprises a flat smooth tongue or blade with a rounded tip at 55. 56 is the other leg of member 52 and is bent at 57 to form a bifurcated tongue 58 parallel to and above 54. A tapered notch 59 is provided in the forward edge of the tongue 58 having an open mouth at 60 and tapered sides extending axially of the tongue and ending at narrower terminus 61.

Upon sliding a clamp such as E, with resilient jaws 21 and 22, on H, the tongues 58 and 54 are pressed toward each other by contact with the under surface of the jaws and the upper surface 23 of E, thus helping to make a resilient detachable connection. At the same time the lip 30 presses against the underside of 54 with an increasing pressure as the clamp E progresses along the tongues of H. The edges of tips 24 and 25 of jaws 21 and 22 are simultaneously contacting the walls 62 and 63 of tapered notch 59, and upon reaching the terminus 61 are under tension which tends to cause the jaws to press against the sides of the notch.

In my preferred construction, the two parts H and E are thus held together by the spring pressure of lip 30 against tongue 54, by the spring pressure of tongues 54 and 56 against the underside of jaws 21 and 22 and also by the spring pressure of the jaw tips 24 and 25 against the side edges 62 and 63 of notch 59. The connection is thus positive and not subject to accidental detachment but may be deliberately disengaged by drawing E gently away from H in the general direction of cable F.

I use the words "battery terminal" to include either the ordinary terminal post of a storage battery or such a post with a well known type of terminal clamp attached thereto.

I claim:

1. In a detachable battery cable connector the combination of a pair of flat elongated metal tongues each parallel to and spaced apart from each other and each fixed at one end to a battery terminal, one of said tongues being of resilient material and bifurcated to form a longitudinally extending notch with sides which converge from a mouth at the free end thereof to a narrower terminus intermediate of said bifurcated tongue and a flat elongated metal clamp, fixed to a battery cable at one end thereof, said clamp having a pair of resilient ears each integral with a longitudinal edge thereof and each bent upwardly and back upon itself to form a pair of oppositely disposed jaws, said jaws being adapted to receive said bifurcated tongue and slidably engage the tapered sides of the notch therein when the other tongue of the pair is received between the tips of the jaws and the flat portion of the clamp.

2. In a detachable battery cable connector the combination of a pair of flat elongated metal tongues, each parallel to and spaced apart from each other, and each fixed at one end to a battery terminal, one of said tongues being bifurcated to form a longitudinally extending notch with sides which converge from a mouth at the free end thereof to a narrower terminus intermediate of said bifurcated tongue and a flat elongated clamp of resilient metal fixed to a battery cable at one end thereof, said clamp having an integral upstanding lip at the forward edge and having a pair of resilient ears, each integral with a longitudinal edge and each bent upwardly and back upon itself to form a pair of oppositely disposed jaws, said jaws being adapted to receive said bifurcated tongue and slidably engage the tapered sides of the notch therein when the other tongue of the pair is received between the tips of the jaws and the flat portion of the clamp with said lip in contact with the outer surface of said other tongue.

3. A slidably detachable electric connector comprising a first flat elongated metal tongue; an elongated clamp of resilient metal having its longitudinal edge portions inturned to form a pair of oppositely disposed transversely tapering jaws, directed toward each other, each jaw having a rounded tip proximate the upper surface of said first tongue, said clamp having its front edge portion bent upwardly to form a rounded upstanding lip in contact with the lower surface of said first tongue and a second flat elongated tongue of resilient metal, extending parallel to and spaced above said first tongue, said second tongue having an axial notch extending longitudinally thereof with tapered side edges in contact with the under surface of said jaws whereby said inturned jaws, upstanding lip and notched tongue resiliently retain the first tongue in the clamp.

JOSEPH H. HAYES.

REFERENCES CITED

The following references are of record in the file of this patent:

UNITED STATES PATENTS

| Number | Name | Date |
|---|---|---|
| 731,400 | Worthington | June 16, 1903 |
| 1,943,591 | Douglas | Jan. 16, 1934 |
| 1,995,115 | Douglas | Mar. 19, 1935 |
| 2,335,843 | Rogoff | Nov. 30, 1943 |
| 2,399,836 | Taylor | May 7, 1946 |
| 2,416,335 | Macy | Feb. 25, 1947 |